United States Patent [19]
Yen

[11] Patent Number: 5,338,460
[45] Date of Patent: Aug. 16, 1994

[54] SULFIDE PRECIPITATION OF HEAVY METALS FROM AQUEOUS SOLUTIONS

[75] Inventor: Jeffrey H. Yen, Woolwich, N.J.

[73] Assignee: Elf Atochem North America, Inc., Philadelphia, Pa.

[21] Appl. No.: 51,509

[22] Filed: Apr. 22, 1993

[51] Int. Cl.$^5$ .............................................. C02F 1/62
[52] U.S. Cl. .................... 210/724; 210/737; 210/912; 210/727; 423/87; 423/561.1
[58] Field of Search ............... 210/724, 725, 726, 727, 210/737, 912–914; 423/87, 561.1, 566.1

[56] References Cited

U.S. PATENT DOCUMENTS

| | | | |
|---|---|---|---|
| 3,218,161 | 11/1965 | Kunda et al. | 423/87 |
| 3,740,331 | 6/1973 | Anderson et al. | 210/726 |
| 4,102,784 | 7/1978 | Schlauch | 210/912 |
| 4,338,200 | 7/1982 | Zeijlstra | 210/737 |
| 4,503,017 | 3/1985 | Gadd et al. | 423/87 |
| 4,652,380 | 3/1987 | Wheeler | 210/724 |

FOREIGN PATENT DOCUMENTS 3418241  11/1985  Fed. Rep. of Germany ........ 423/87

Primary Examiner—Peter A. Hruskoci

[57] ABSTRACT

A process is disclosed for the removal of dissolved heavy metals from aqueous solution contaminated therewith wherein at least one of said heavy metals is reacted with a water-soluble inorganic sulfide or hydrosulfide at a defined elevated temperature and a controlled pH of between about 2 to about 3.5 to thereby precipitate heavy metal sulfide, and thereafter separating the precipitate from the filtrate.

6 Claims, 2 Drawing Sheets

SULFIDE PRECIPITATION OF HEAVY METALS FROM AQUEOUS SOLUTIONS

BACKGROUND OF THE INVENTION

This invention concerns the removal of heavy metal contaminants from aqueous solutions containing such metals in solution. More particularly, it concerns the precipitation of at least one heavy metal from industrial wastewater or groundwater containing at least one such metal in solution by reacting said metal with a water-soluble inorganic sulfide or hydrosulfide at a defined elevated temperature and controlled acidity to precipitate the heavy metal sulfide formed.

PRIOR ART

Various methods have been used or proposed for the treatment of industrial wastewater and groundwater to remove heavy metals. Chemical treatment methods have been found to be generally effective for the removal of heavy metals. For example, limestone, hydroxides, carbonates, and sulfides have been used to remove heavy metals from aqueous solutions through chemical reactions (see Treatability Manual, Vols. 1-5, Monsanto Research Corporation, EPA 600 8 80 042a, July, 1980).

Sulfide precipitation has been reported to be an effective alternative to hydroxide and other precipitation methods (R. W. Peters and Y. Ku, "Batch Precipitation Studies For Heavy Metal Removal By Sulfide Precipitation", AIChE Symposium Series No. 243, Vol. 81). Two principle processes exist for sulfide precipitation: soluble sulfide precipitation (SSP) and insoluble sulfide precipitation (ISP). In the SSP process, water-soluble sulfides, e.g., sodium sulfide or sodium hydrosulfide, are used to treat the metals in the water while in the ISP process slightly water-soluble sulfides, e.g., ferric sulfide or calcium sulfide are utilized. Conventional sulfide precipitation processes have been performed at ambient temperature and are limited to the treatment of wastewater containing little or no organic materials and complexing compounds (D. Bhattacharyya et al., "Precipitation of Heavy Metals with Sodium Sulfide: Bench Scale and Full Scale Experimental Results" AIChE Symposium No. 209, Vol. 77). Other prior disclosures of sulfide precipitation of heavy metals from solution include, for example U.S. Pat. Nos. 4,503,017 and 4,652,380.

STATEMENT OF THE INVENTION

This invention is a process for removing dissolved heavy metal from an aqueous solution contaminated therewith comprising reacting at least one said heavy metal with a water-soluble inorganic sulfide or hydrosulfide at a controlled pH between about 2 and about 3.5 and at a temperature ranging between at least 100° F. and less than 212° F. during the reaction and precipitation of the heavy metal sulfide product of the reaction, continuing the process for a time sufficient to provide a heavy metal removal efficiency in excess of 90% and separating the precipitate from the purified solution.

THE DRAWING

FIG. 1 of the drawing is a diagrammatic representation of a continuous system employing continuous stirred tank reactors, and FIG. 2 is a graph plotting arsenic removal efficiency against stoichiometric ratio of sulfide/arsenic.

DETAILED DESCRIPTION OF THE INVENTION

Figure 1:
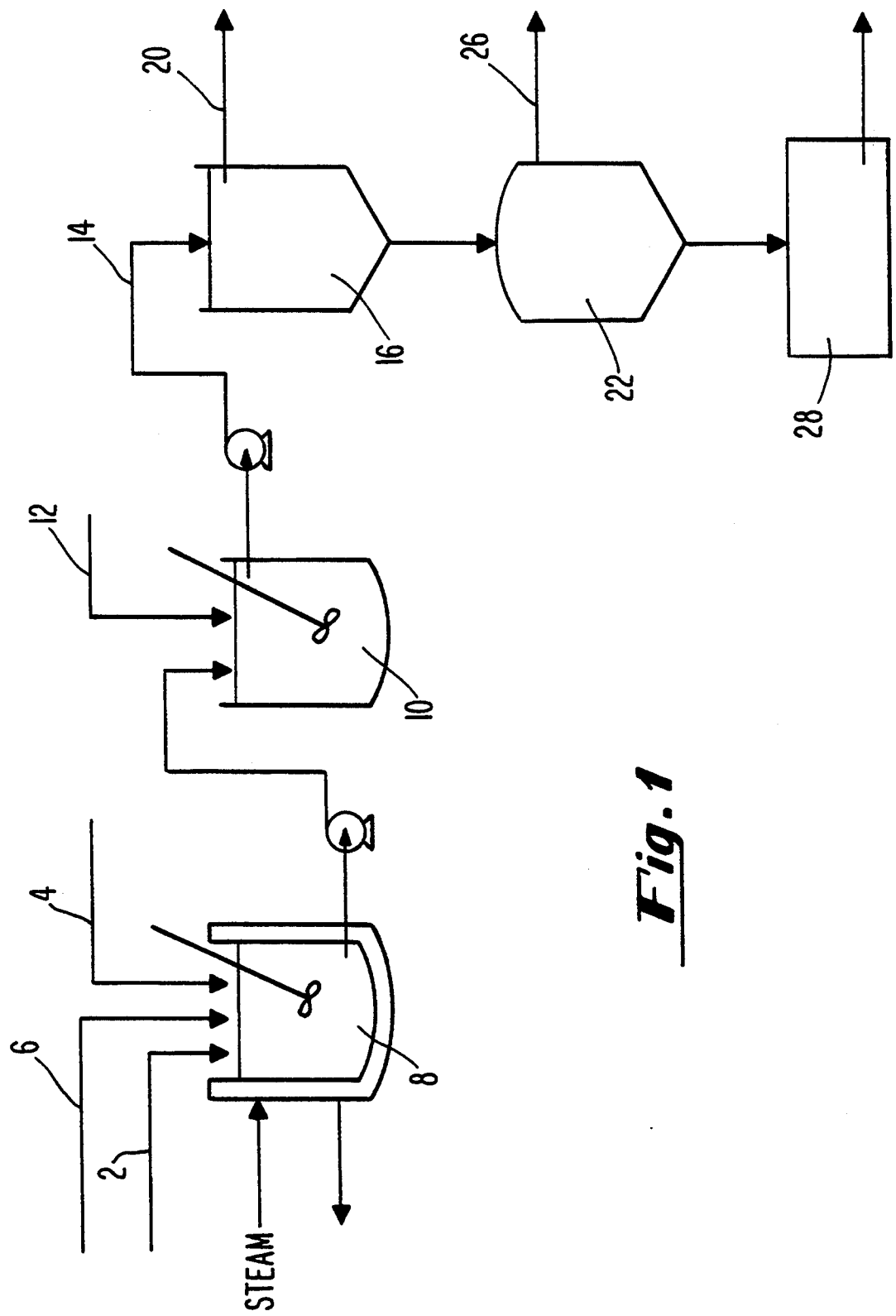

This invention is a process for the precipitation of dissolved heavy metals including, for example, arsenic, antimony, tin and lead, from water contaminated therewith. The process is especially useful for the removal of arsenic from industrial wastewater and contaminated groundwater which commonly contains organic materials and complexing agents.

To begin the process of removing the dissolved heavy metal, which will, for ease of explanation, be represented hereinafter by arsenic, the contaminated wastewater or groundwater is either first treated with a mineral acid, preferably hydrochloric, sulfuric or nitric acid, to bring the pH of the water down to a pH of between about 2 to about 3.5, if necessary, and then the pH adjusted water is treated with a water-soluble sulfide or hydrosulfide, or the contaminated water is first treated with the water-soluble sulfiding agent and then with a mineral acid to lower the pH to the prescribed range. Whichever sequence is used, the pH is maintained within the given range during the reaction by the additional treatment of the reaction mass with the selected mineral acid, if needed.

The water-soluble inorganic sulfide or hydrosulfide is reacted with the dissolved arsenic in the contaminated water at a stoichiometric ratio of from about 2 to about 4.5. Preferably, about 3. It is added to the reactor either in solution (aqueous) or in solid form. The water-soluble inorganic sulfide or hydrosulfide is preferably sodium sulfide or hydrosulfide but also includes others, e.g., ammonium and potassium sulfide or hydrosulfide and other sulfide and hydrosulfide salts which are completely soluble in the contaminated water at the concentration of the reactants used in the process of this invention.

A critical feature of this invention to obtain the unexpected efficiency of arsenic removal from the contaminated water is in the use of an elevated reaction and precipitation temperature of at least about 100° F. (37.8° C.), preferably about 130° F. (54.4° C.) to about 160° F. (71.1° C.), but less than 212° F. (100° C.). This temperature range must be maintained during the entire reaction time and precipitation time of the process to obtain the desired results.

The combined reaction and precipitation time will extend sufficiently to precipitate an amount of arsenic from the contaminated water equivalent to a removal efficiency in excess of 90%. Preferably, the combined time will range from about 0.5 to about 6 hours, more preferably 1 to 5 hours. Most preferably, the combined time will extend sufficiently to precipitate arsenic to a degree necessary to meet drinking water standards.

It is preferable but not critical, to first oxidize the dissolved arsenic in the contaminated water to raise the valency of the ion to a more reactive state and to oxidize organic compounds which may be present in the water. This may occur incidentally with the adjustment of the pH of the contaminated water with sulfuric acid.

During the reaction and precipitate formation the reaction mass is agitated to increase the reaction rate but not to the degree that substantial shear stress is placed on the precipitated particles. The absence of sheer stress will avoid formation of smaller particle sizes of the precipitate and facilitate separation.

Optionally, a flocculent may be added to the contaminated solution after it is charged from the reactor to thereby enhance or enlarge the average particle size distribution of the precipitate when formed. Flocculents are typicaly high molecular weight ionic polymers, such as Betz polymer 1100, 1115L, 1116L, 1147L, 1154L and 1160X, made by Betz Laboratories, Trevose, Pa.

After precipitation, the precipitate and supernatent liquid are separated by any suitable solid-liquid separation means, for example by filtration, and the purified liquid returned to the ground, to storage or to a finishing treatment. The wet cake (precipitate) may then be oxidized in an oxidizer or incinerator. Metal oxides produced can then be sold or recycled.

While the process of this invention is effective for the removal of small amounts (e.g. <100 ppm) of arsenic from contaminated water, it is highly beneficial for removing arsenic from heavily arsenic contaminated groundwater, particularly that containing organic compounds and complexes (over 100 ppb). Amounts of arsenic in the range of 500 to over 5000 parts per million, on a weight basis, in wastewater are readily removed down to or below drinking water standards by the practice of this invention.

Various known finishing procedures may be used to further purify the aqueous product resulting from the process of this invention, if desired. Such techniques include post-treatment of the filtrate with activated alumina, activated carbon or by passage through ion-exchange resins. The flushing and/or regenerating solution from this post-treatment can be recycled back to the reactor thereby eliminating much of the waste associated with this process.

With regard to the Drawing, FIG. 1 is a diagram of a continuous system wherein industrial, surface or underground wastewater containing dissolved arsenic, typified by a chemical content of the following tabulated amounts, is depicted as being treated in stages.

| Contaminated Groundwater | |
|---|---|
| Chemicals | Concentration, by weight |
| Arsenic | 2971 ppm** |
| Chloroform | 160 ppb*** |
| Chlorobenzene | 94 ppb |
| Alpha BHC* | 490 ppb |
| Gamma BHC | 740 ppb |
| Beta BHC | 95 ppb |
| Delta BHC | 410 ppb |

*BHC = benzene hexachloride
**ppm = parts per million parts of solution
***ppb = parts per billion parts of solution
The pH of the groundwater before treatment was 5.5–5.7.

Groundwater is fed through line 2 into continuously stirred tank reactor (CSTR) 8 where an oxidizing agent may be optionally incorporated by means not shown to raise the valency of the arsenic from 3 to 5 while also oxidizing any organic compounds present. Oxidizing agents will include, for example, potassium permanganate, hydrogen peroxide, ozone, sulfuric acid, nitricacid, and the like. The sulfuric acid used to reduce the solution pH may serve to oxidize the arsenic and organics. CSTR 8 has a steam jacket, coiled or other means capable of heating the reactor contents to over 100° F. and preferably at least 160° F. A sulfiding agent, e.g., sodium sulfide is fed through line 4 to reactor 8 either simultaneously with, before or after the groundwater is introduced. A mineral acid, to lower the groundwater pH, may be added to the reactor 8 through line 6 either simultaneously with, before or after introduction of the groundwater. The reaction proceeds after the reactants are all combined in the proper proportions to provide a reaction pH of about 2 to about 3.5. The temperature of the reaction mass is raised to at least 100° F., preferably, at least 130° F., and mild, low-shear stirring is started. Following about 0.5 to 6 hours of reaction and precipitation while maintaining the pH (by continued or periodic feeding of mineral acid to the reactor) between about 2 and about 3.5, the groundwater containing the formed precipitate is passed from the reactor 8 to a floculation tank 10. Aqueous flocculent solution is added into tank 10 via line 12. Flocculated slurry is pumped from tank 10 and enters a settling tank or a thickener 16 via line 14. As the slurry in tank 16 thickens, it is removed at the bottom of the tank and passes into a conventional liquid-solid separator 22 via line 18. The filtrate is discharged from separator 22 via line 26 and returned to the ground, passed to storage, recycled to either reactor 8 or settler 16, or further post-treated. The supernant 20 discharged from settler 16 is optionally post-treated to further lower its arsenic content in a finishing zone and then discharged to the ground or other proper disposal means. The wet cake or precipitate slurry is then passed from the bottom of separator 22 to the oxidizer/incinerator 28 where the arsenic sulfide is converted to arsenic oxide.

The treated water is optionally post-treated by treating it in a finishing zone to reduce the arsenic content of the treated groundwater even further, if desired. Post-treatment will, for example, consist of passing the groundwater through activated carbon, activated alumina and/or ion exchange resins.

The following examples are set forth to demonstrate this invention.

EXAMPLES 1 COMPARISON 100 g of the contaminated groundwater (as tabulated hereinbefore) was added to a glass stirred reactor followed by the addition of a quantity of 13% (by weight) aqueous solution of sodium sulfide ($Na_2S$). Sulfuric acid (conc. $H_2SO_4$) was carefully added to the reactor to adjust the solution pH. The reaction and precipitation were carried out at ambient temperature (75° F.). After an hour (1 hr.), the reaction mass was filtered through a filter paper and the arsenic content in the supernatent (filtrate) measured with atomic absorption. Five experiments were carried out under the above-conditions except that the amount of $Na_2S$ solution added in c.c.'s was increased for each experiment. The results of these experiments are summarized in Table 1 below.

TABLE 1

| Experiment No. | 1 | 2 | 3 | 4 | 5 |
|---|---|---|---|---|---|
| $Na_2S$ added | 2.7 | 5.3 | 8.0 | 10.7 | 13.3 |
| Equivalent molar ratio* | 1 | 2 | 3 | 4 | 5 |
| pH before acid addition | 8.5 | 11.4 | 12.3 | 12.4 | 12.5 |
| pH after acid addition | 3.0 | 3.0 | 3.1 | 3.1 | 3.1 |
| Arsenic in treated water in ppm | 2622 | 2063 | 1116 | 911 | 503 |
| Arsenic removal in % | 11.7 | 30.6 | 62.5 | 69.3 | 83.1 |

TABLE 1-continued

| Experiment No. | 1 | 2 | 3 | 4 | 5 |
|---|---|---|---|---|---|
| (by wt.) | | | | | |

*Ratio of sulfide to arsenic

Figure 2:
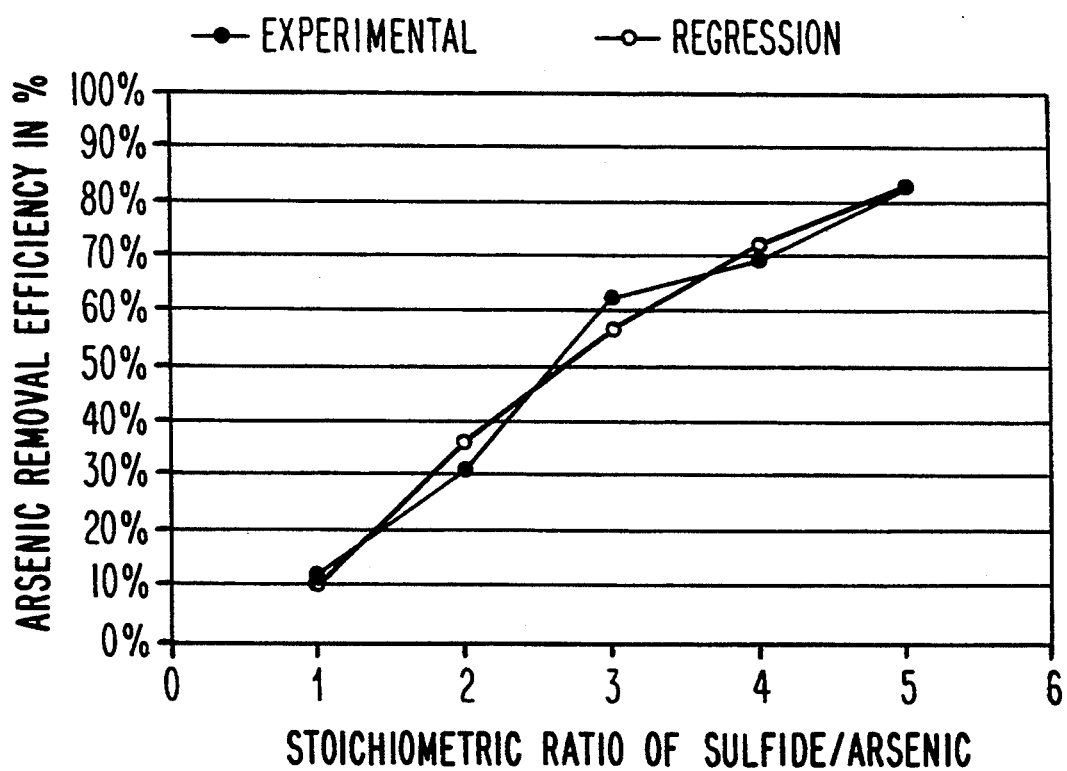

The above results are plotted in FIG. 2 in terms of arsenic removal efficiency vs. the soichiometric ratio of sulfide/arsenic (S=/As) ratio. The arsenic removal efficiency increases with increasing S=/As ratio.

EXAMPLE 2

500 g of the groundwater (as tabulated hereinbefore) was added to a glass stirred reactor. The reactor temperature was adjusted to and maintained at approximately 140° F. (60° C.) throughout the reaction and precipitation. The pH in the reactor was adjusted from 6.0 to 5.0 and maintained at that pH level with sulfuric acid addition while 33.9 c.c. of 13% (by weight) $Na_2S$ solution was added to the reactor to provide a sulfide to arsenic stoichiometric ratio of 2.5. The pH was then adjusted with sulfuric acid addition to 3.0. After a total retention time of approximately an hour with mild, low-shear stirring, the mixture in the reactor was filtered through filter paper of the type used in Example 1. The arsenic content in the supernatant (flitrate) was measured at 64 ppm, which is equivalent to an arsenic removal efficiency of 97.8%. In comparison, the corresponding arsenic removal efficiency at ambient temperature, through interpolation of FIG. 2, would be about 45%.

EXAMPLE 3

Comparison

The experiment of Example 2 was repeated except that the temperature of the reactor for the first 25 minutes of the reaction was maintained at 155° F. (68.3° C.) and then the heater was turned off. Additionally, the 13% $Na_2S$ solution added to the reactor was raised to 40 mL to provide a stoichiometric ratio of 3. Concentrated $H_2SO_4$ was then added to adjust the pH to 5. After a total retention time of over 1 hour with mild stirring, the reactor slurry was filtered and the arsenic content of the supernatent (filtrate) measured. The arsenic content was found to be reduced from 2971 ppm to 1061 ppm, a removal efficiency of 64.2%.

EXAMPLE 4

500 g. of the groundwater (as tabulated hereinbefore) was added to a glass stirred reactor and the temperature in the reactor adjusted to and maintained at 155° F. (68.3° C.). during the reaction and precipitation. 58 mL of the 13% $Na_2S$ solution was added to the reactor to provide a stoichiometric ratio of about 4. Concentrated $H_2SO_4$ was then added to the reactor to adjust the pH to 3. After a total retention time of 1 hour in the reactor with mild stirring, the reactor slurry was filtered as in the previous examples and the arsenic content in the supernatant (filtrate) was measured. The arsenic content in the treated groundwater was 2.1 ppm providing an arsenic removal efficiency of 99.9%. In comparison, the corresponding arsenic removal efficiency at ambient temperatures, through interpolation of FIG. 2, would be about 70%.

The Example 1 experiments demonstrate that increased addition of the sulfide agent will improve arsenic removal efficiency when the reaction pH is maintained in the 2–3.5 range. However, too much arsenic remains, even after treatment with a large excess of sulfide, to provide good drinking water.

Example 2 demonstrates, when compared to Example 1, that elevated temperature during the reaction and precipitation strongly influences the arsenic removal efficiency of the process.

Example 3 demonstrates that the increase temperature for the process must be maintained through the entire procedure to complete formation of the precipitate or the arsenic removal efficiency, compared to Example 2, is negatively influenced and the arsenic content of the treated groundwater remains too high. In addition, the pH is beneficially adjusted to below 3.5.

Example 4 demonstrates a preferred procedure for this invention wherein both a high temperature is maintained through complete precipitation and a relatively high dosage of sulfiding agent is employed. The efficiency of 99.9% approaches drinking water standards for the test groundwater. A finishing treatment will readily produce good quality drinking water from the processed water.

Arsenic removal efficiency in % is calculated using the following equation:

$$100 - \frac{\text{Final arsenic content of water (ppm)}}{\text{Original arsenic content of water (ppm)}} \times 100$$

I claim:

1. A process of the removal of dissolved heavy metal selected from the group consisting of arsenic, antimony, tin and lead, from an aqueous solution contaminated therewith comprising reacting at least one said heavy metal with a water-soluble inorganic sulfide or hydrosulfide at a stoichiometric ratio of from about 2 to about 4.5, at a pH between about 2 to about 3.5 and at a temperature ranging between at least 100° F. and less than 212° F. during the reaction and precipitation of the heavy metal sulfide product of the reaction, continuing the process and maintaining said temperature for a time at least sufficient to precipitate the heavy metal in an amount equivalent to a removal efficiency in excess of 90%, and separating the precipitate from the purified solution.

2. The process of claim 1 wherein said heavy metal is arsenic.

3. The process of claim 2 wherein the pH is adjusted by the incorporation of a mineral acid into the contaminated solution.

4. The process of claim 2 wherein the process is continued for from 0.5 to 6 hours.

5. The process of claim 1 wherein the contaminated solution contains in excess of 500 ppm of heavy metal and at least 100 ppm of organic compounds.

6. A process for the removal of dissolved arsenic from wastewater or groundwater contaminated therewith comprising reacting said arsenic with sodium sulfide at a stoichiometric ratio of from about 2 to about 4.5, at a controlled pH adjusted to from about 2 to about 3.5 by mixing into said water a mineral acid, at a temperature of about 130° to 160° F. maintained until precipitation of arsenic sulfide is complete, for a duration of from about 1 to about 5 hours, and separating the precipitate from the purified water.

* * * * *